March 3, 1959

B. J. POWELL 2,875,641

FOOT OPERATED PARKING BRAKE

Filed Sept. 21, 1955

Inventor
Burnet J. Powell

March 3, 1959
B. J. POWELL
2,875,641
FOOT OPERATED PARKING BRAKE
Filed Sept. 21, 1955
2 Sheets-Sheet 2
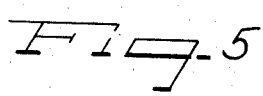
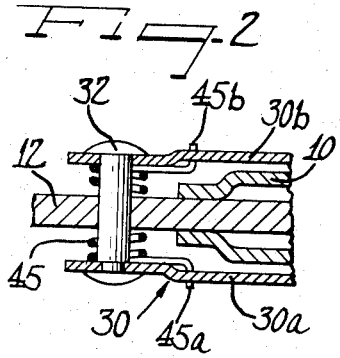
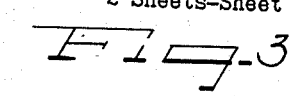
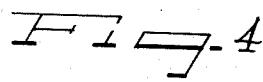
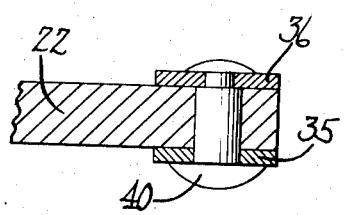
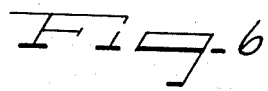
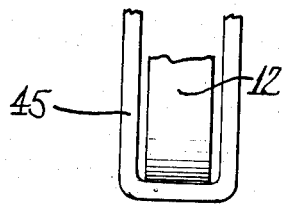
Inventor
Burnet J. Powell
by Hill, Sherman, Meroni, Gross & Simpson
Attys United States Patent Office
2,875,641
Patented Mar. 3, 1959

2,875,641

FOOT OPERATED PARKING BRAKE

Burnet J. Powell, Berkley, Mich., assignor, by mesne assignments, to The Bingham Herbrand Corporation, a corporation of Ohio Application September 21, 1955, Serial No. 535,629

7 Claims. (Cl. 74—539)

This invention relates to a lever structure, and particularly to a foot-operated foot-release brake lever assembly for vehicles.

It is an important object of the present invention to provide a novel and improved foot-operated foot-release parking brake assembly.

It is another object of the present invention to provide a novel foot-release structure for a brake lever assembly.

Still another object of the present invention is to provide a brake lever structure providing minimum interference with the entry and exit of the driver from the passenger compartment of the vehicle.

A further object is to provide a brake lever assembly which is easily released by the operator from brake setting condition.

In accordance with the objects and features of the present invention, there is provided a pivotally mounted brake-applying lever arm having ratchet and pawl means associated therewith for retaining the lever arm in brake setting positions to which advanced, the ratchet and pawl means being releasable by a foot-operated release device.

In accordance with a further feature of the present invention, means is provided for preventing transmission of ratcheting oscillation of the pawl means to the release device.

In accordance with still a further feature of the present invention, means is provided for absorbing the shock incident to release of the brake lever from brake setting condition.

Other objects, features and advantages of the present invention will be apparent from the following detailed description taken in conjunction with the accompanying drawing, in which:

On the drawings:

Figure 2 is a fragmentary horizontal sectional view taken generally along the line II—II of Figure 1;

Figure 3 is a fragmentary end elevational view of the structure of Figure 1;

Figure 4 is a fragmentary cross sectional view taken generally along the line IV—IV of Figure 1;

Figure 5 is a longitudinal sectional view of the link member coupling the foot release device to the pawl means; and Figure 6 is a fragmentary end elevational view illustrating the manner in which the spring associated with the foot release mechanism extends about the bracket carrying the same.

As shown on the drawings:

Figure 1:
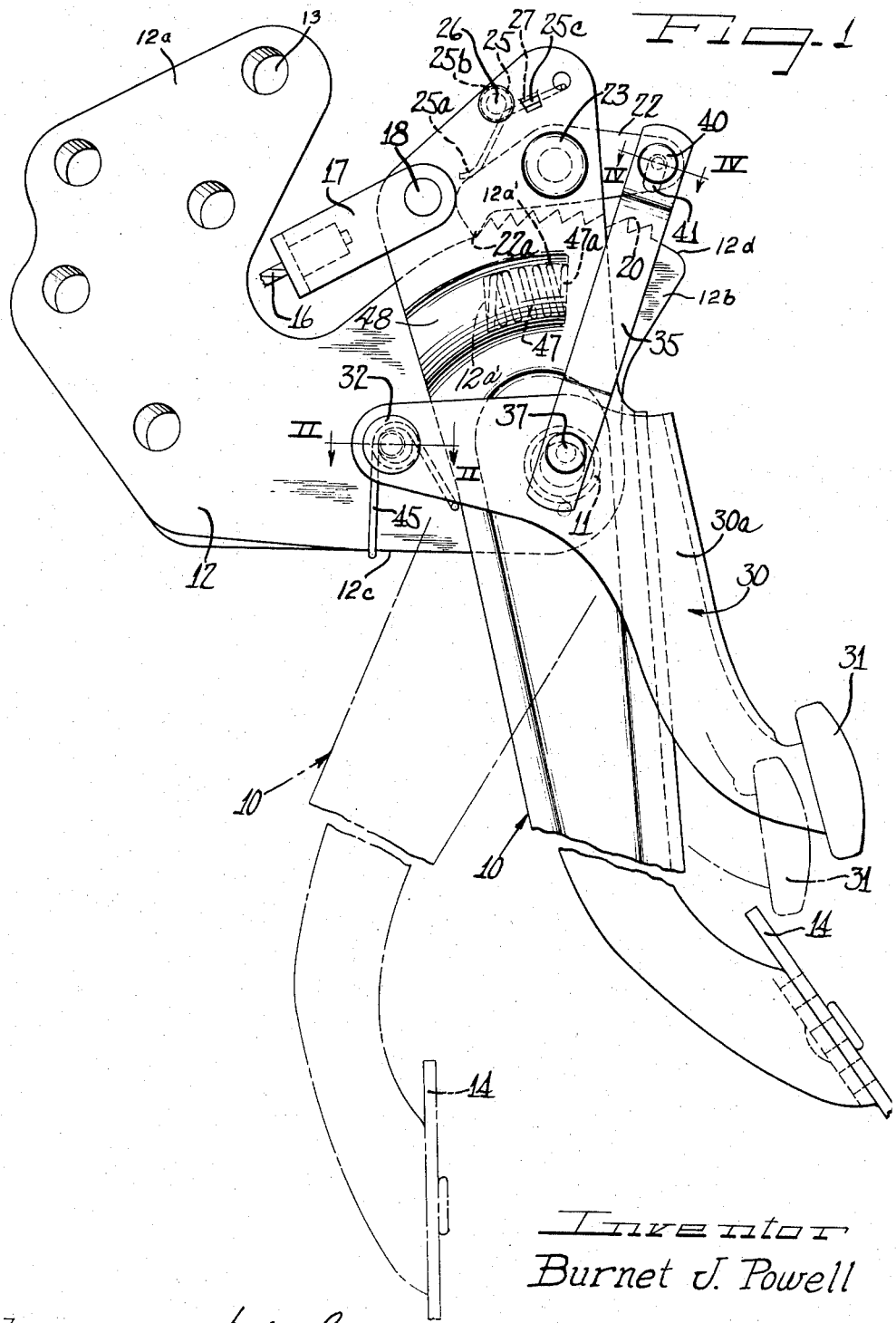
Figure 1 is a side elevational view of a brake lever structure in accordance with the present invention.

The brake lever structure according to the present invention may comprise a foot-operated lever arm 10 pivotally mounted by means of a rivet 11 to a bracket 12 having a forward or vehicle securing portion 12a and a rearward or operator attaching portion 12b, which may be secured to the left side of a vehicle through bolt holes 13. The rearward portion 12b has a bottom edge 12c and a top edge 12d. The lever arm 10 may carry a pedal 14 at its lower end for operation by the left foot of the operator and the lever arm may be coupled to a brake actuating cable 16 by means of a link 17 and pin 18 at the upper end thereof so that as the foot pedal 14 is depressed, the lever arm 10 swings about the pivot 11 and applies a tension to the cable 16 for setting the brakes of the vehicle.

In use of the assembly as a parking brake, it is necessary to retain the lever arm 10 in successive brake setting positions to which it is moved, and to this end, the bracket 12 is provided with a series of ratchet teeth 20 arcuately disposed about the pivot 11, and the lever arm 10 has a pawl 22 pivotally connected to the upper end thereof by means of a rivet 23 and disposed for engaging the successive teeth 20 as the brake lever arm 10 is moved toward brake setting condition. Spring means 25 is carried by the lever arm 10 and has an end portion 25a acting downwardly on the end of the pawl 22 carrying a tooth 22a for urging the tooth 22a into engagement with the successive teeth 20. It will be understood that the loop portion 25b of the spring 25 may encircle a pin 26 extending through the lever arm 10, and the opposite end portion 25c of the spring may be engaged by a lug 27 struck out from the lever arm 10.

For releasing the ratchet and pawl means when it is desired to release the brakes, a foot-operated release lever 30 is provided having a foot pad 31 for depression by the foot of the operator to release the brakes. The foot pad 31 is carried by the bracket 12 by means of a rivet 32, the foot pad 31 preferably being located just below the instrument panel of the vehicle, one foot or more above the brake pedal 14, and forwardly of the instrument panel and substantially out of the way of the driver's path in entering or leaving the vehicle. As seen in Figure 2, the release lever 30 includes a pair of side flanges 30a and 30b extending on opposite sides of the brake lever arm 10 and bracket 12. A pair of links 35 and 36 are connected to the respective side flanges 30a and 30b of the release lever 30 by means of rivets such as 37 and to the pawl mechanism 22 by means of a single rivet 40. It will be observed that the links 35 and 36 are provided with elongated slots such as 41 for allowing the pawl 22 to pivot as the tooth 22a rides over successive teeth 20 without imparting a corresponding motion to the lever 30. However, when the pad 31 is pressed by the foot of the operator, the lever 30 pivots about rivet 32 to draw the links 35 and 36 downwardly and pivot the tooth 22a of pawl 22 upwardly out of engagement with the ratchet. As seen in Figures 1 and 2, a wire spring 45 is wrapped about the shank of the rivet 32 at each side of the bracket 12 and has outturned end portions 45a and 45b for urging the lever arm 30 upwardly about the pivot 32 into the nonrelease position shown in solid outline in Figure 1.

When the brakes are released by means of the lever 30, the tension of the brakes would normally snap the lever arm 10 back into its brake release position with considerable impact at the end of its travel. To cushion this impact, a compression spring 47 is interposed between the bracket 12 and the lever arm 10 in such a manner as to resist movement of the lever arm 10 in the brake release direction. As best seen in Figure 3, the respective side wall portions 10a and 10b of the upper portion of the brake lever arm 10 have embossments defining a tubular housing 48 accommodating the compression spring 47, which as seen in Figure 1 is disposed in a slot 12a' in the bracket 12.

The operation of the illustrated brake lever structure will now be readily apparent. To set the brakes, the foot of the operator is placed on the foot pedal 14 and depressed to retract the actuating cable 16, the pawl tooth 22a riding over the successive teeth 20 of the ratchet. The ratcheting oscillation of pawl 22 is accommodated by the elongated slots 41 in the links 35 and 36 to avoid transmitting this motion to the release lever 30. To release the brakes, the foot of the operator is raised a substantial distance above the floor level and above the foot pedal 14 into engagement with the pad 31 and depressed to pivot the pawl 22 into release position against the action of the spring 25 to allow the brake lever 10 to return to release position, spring 47 cushioning this movement of the brake lever arm 10.

It will be obvious to those skilled in the art, that the whole assembly as illustrated in the drawings may be inverted, reversed or turned in any manner and yet operate when secured to a vehicle and that the parts have been described in light of the way they are illustrated in the drawings, i. e. with brake setting pressure applied from the right side of Figure 1 of the drawings as presented.

It will be apparent that many modifications and variations may be effected without departing from the scope of the novel concepts of the present invention.

I claim as my invention:

1. A brake actuating structure comprising a bracket having a forward portion for securement to a vehicle having a rear brake operator attaching bracket portion, said rear bracket portion having a bottom edge and a top edge, said brake operator comprising a foot operated brake actuating lever pivotally mounted intermediate its ends on said rear bracket portion and having a foot pad on one end thereof, said one end extending downwardly and below the bottom edge of said rear bracket portion, said one end having a rearwardly curved portion and having said foot pad at the end of said curved portion, said one end moving from rear to front when applying brake setting force, the other end of said brake lever extending upwardly and above the top edge of said rear bracket portion and moving from front to rear when applying brake setting force and having means for attaching a brake actuating cable thereto, a lever locking means for said brake actuating lever comprising ratchet and pawl means, said ratchet means carried by said bracket including a series of arcuately disposed ratchet teeth, a pawl pivotally carried by said brake actuating lever for successively engaging the ratchet teeth as the brake actuating lever is moved toward brake setting position to lock said lever in set position, resilient means engaging said pawl and biasing said pawl into lever locking engagement with said ratchet means, a footbrake release lever pivotally mounted on said rear bracket portion and having one end extending rearward of said one end of said foot operated brake lever and below the bottom edge of said rear bracket portion and above said brake actuating lever foot pad, said one of said foot brake release lever moving from rear to front when applying brake release force, said foot brake actuating lever and said brake release lever being normally in rearward position when said brake is released, and resilient means normally maintaining said brake release lever in non-release position, and a coupling link connecting said brake release lever and said lever locking means to disengage said pawl and ratchet means to release said foot operated brake actuating lever for movement to brake release position.

2. A brake actuating structure comprising a bracket having a forward portion for securement to a vehicle and a rear brake operator attaching portion, said rear bracket portion having a bottom edge and a top edge, said brake operator comprising a foot operated brake actuating lever pivotally mounted intermediate its ends on said rear bracket portion and having a front pad on one end thereof, said one end extending downwardly and below the bottom edge of said rear bracket portion, said one end moving from rear to front when applying brake setting force, the other end of said brake lever extending upwardly and moving from front to rear when applying brake setting force and having means for attaching a brake actuating cable thereto, lever locking means for said brake actuating lever comprising ratchet and pawl means, said ratchet means carried by said bracket including a series of arcuately disposed ratchet teeth, a pawl pivotally carried by said brake actuating lever for successively engaging the ratchet teeth as the brake actuating lever is moved toward brake setting position to lock said lever in set position, resilient means engaging said pawl and biasing said pawl into lever locking engagement with said ratchet means, a foot brake release lever pivotally mounted on said bracket and having one end extending rearward of said one end of said foot operated brake lever and below the bottom edge of said rear bracket portion and above said brake actuating lever foot pad, resilient means normally maintaining said brake release lever in non-release position, and a coupling link connecting said brake release lever and said locking means to discharge said pawl and ratchet means to release said foot operated brake actuating lever for movement to brake release position.

3. A brake actuating structure comprising a bracket having a portion for securement to a vehicle and a brake operator attaching portion, said brake operator attaching portion having a bottom edge and a top edge, said brake operator comprising a foot operated brake actuating lever pivotally mounted intermediate its ends on said brake operator attaching portion and having a foot pad on one end thereof, said one end extending downwardly and below the bottom edge of said brake operator attaching portion, said one end having a rearwardly curved portion and having said foot pad at the end of said curved portion, said one end moving from rear to front when applying brake setting force, the other end of said brake lever extending upwardly and above the edge of said brake operator attaching portion and moving from front to rear when applying brake setting force and having means for attaching a brake actuating cable thereto, lever locking means for said brake actuating lever comprising ratchet and pawl means, said ratchet means carried by said bracket including a series of arcuately disposed ratchet teeth, a pawl pivotally carried by said brake actuating lever for successively engaging the ratchet teeth as the brake actuating lever is moved toward brake setting position to lock said lever in set position, resilient means engaging said pawl and biasing said pawl into lever locking engagement with said ratchet means, a brake release lever pivotally mounted on said bracket and having one end extending rearward of said one end of said foot operated brake lever and below the bottom edge of said brake operator attaching portion and above said brake actuating lever foot pad, resilient means normally retaining said brake release lever in non-release position, and a coupling link connecting said brake release lever and said lever locking means to disengage said pawl and ratchet means to release said foot operated brake actuating lever for movement to brake release position.

4. A brake actuating structure comprising a bracket having a forward portion for securement to a vehicle and a rear brake operator attaching portion, said rear portion having a bottom edge and a top edge, said brake operator comprising a foot operated brake actuating lever pivotally mounted intermediate its ends on said rear portion and having a foot pad on one end thereof, said one end extending downwardly and below the bottom edge of said rear portion, said one end having a rearwardly curved portion and having said foot pad at the end of said curved portion, said one end moving from rear to front when applying brake setting force, the other end of said brake lever extending upwardly and above the top edge of said rear bracket portion and pivoting clockwise to move from front to rear while applying brake setting force and having means for attaching a brake actuating cable thereto, lever locking means for said brake actuating lever comprising ratchet and pawl means, said ratchet means carried by said bracket including a series of arcuately disposed ratchet teeth, a pawl pivotally carried by said brake actuating lever for successively engaging the ratchet teeth as the brake actuating lever is moved toward brake setting position to lock said lever in set position, resilient means engaging said pawl and biasing said pawl into lever locking engagement with said ratchet means, foot brake release lever pivotally mounted on said rear portion and having one end extending rearward of said one end of said foot operated brake lever and below the bottom edge of said rear portion and above said brake actuating lever foot pad, said one end of said foot brake release lever pivoting clockwise to move from rear to front when applying brake release force, said foot brake actuating lever and said release lever being normally in rearward position when said brake is released, resilient means normally maintaining said brake release lever in non-release position, and a coupling link connecting said brake release lever and said lever locking means to disengage said pawl and ratchet means to release said foot operated brake actuating lever for movement to brake release position.

5. A brake actuating structure comprising a bracket having a forward portion for securement to a vehicle and a rear brake operator attaching portion, said rear portion having a bottom edge and a top edge, said brake operator comprising a foot operated brake actuating lever pivotally mounted intermediate its ends on said rear portion and having a foot pad on one end thereof, said one end extending downwardly and below the bottom edge of said rear portion, said one end having a rearwardly curved portion and having said foot pad at one end of said curved portion, said one end moving from rear to front when applying brake setting force, the other end of said brake lever extending upwardly and above the top edge of said rear portion pivoting clockwise to move from front to rear when applying brake setting force and having means for attaching a brake actuating cable thereto, lever locking means for said brake actuating lever comprising ratchet and pawl means, said ratchet means carried by said bracket including a series of arcuately disposed ratchet teeth, a pawl pivotally carried by said brake actuating lever for successively engaging the ratchet teeth as the brake actuating lever is moved toward brake setting position to lock said lever in set position, resilient means engaging said pawl and biasing said pawl into lever locking engagement with said ratchet means, a foot brake release lever pivotally mounted on said rear portion and having one end extended rearward of said one end of said foot operated brake lever and below the bottom edge of said rear portion and above said brake actuating lever foot pad, said one end of said foot brake release lever pivoting clockwise to move from rear to front when applying brake release force, said foot brake actuating lever and brake release lever being normally in rearward position when said brake is released, resilient means normally maintaining said brake release lever in non-release position, and a coupling link connecting said brake release lever and said pawl to disengage said pawl and ratchet means to release said foot operated brake actuating lever for movement to brake release position.

6. A brake actuating structure as in claim 5 and wherein said bracket has a slot, and a compression spring disposed in said slot and having an end portion engageable with said brake actuating lever to cushion release of the brake actuating lever as it approaches brake release position.

7. A brake actuating structure as in claim 5 and having a lost motion means between said release lever and said pawl for isolating ratchet motion of said pawl from said release lever.

References Cited in the file of this patent

UNITED STATES PATENTS

| | | |
|---|---|---|
| 1,333,535 | Bopp | Mar. 9, 1920 |
| 1,368,684 | Andree | Feb. 15, 1921 |
| 1,840,960 | Krueger | Jan. 12, 1932 |
| 1,876,498 | Hawkins | Sept. 6, 1932 |
| 1,951,212 | Sawatzky | Mar. 13, 1934 |
| 2,014,300 | Strobridge | Sept. 10, 1935 |
| 2,086,010 | Wenn | July 6, 1937 |
| 2,141,266 | Dickerson | Dec. 27, 1938 |
| 2,159,821 | Sandberg et al. | May 23, 1939 |
| 2,169,888 | Snell | Aug. 15, 1939 |
| 2,212,375 | McCarthy | Aug. 20, 1940 |
| 2,288,169 | McCarthy | June 30, 1942 |
| 2,308,898 | Skareen | Jan. 19, 1943 |
| 2,587,725 | Hinsey | Mar. 4, 1952 |

FOREIGN PATENTS

| | | |
|---|---|---|
| 74,761 | Austria | May 15, 1917 |
| 614,747 | Great Britain | Dec. 22, 1948 |